(12) United States Patent
Aikawa

(10) Patent No.: US 7,103,849 B2
(45) Date of Patent: Sep. 5, 2006

(54) IMAGE PROCESSING APPARATUS, AND METHOD OF CONTROLLING THE IMAGE PROCESSING APPARATUS

(76) Inventor: Masafumi Aikawa, c/o Minolta Co., Ltd., Osaka Kokusai Bldg., 2-Chome, Azuchi-Machi, Chuo-Ku, Osaka-Shi, Osaka 541-8556 (JP)

( * ) Notice: Subject to any disclaimer, the term of this patent is extended or adjusted under 35 U.S.C. 154(b) by 214 days.

(21) Appl. No.: 09/768,574

(22) Filed: Jan. 25, 2001

(65) Prior Publication Data
US 2002/0054008 A1 May 9, 2002

(30) Foreign Application Priority Data
Feb. 4, 2000 (JP) .............................. 2000-028275

(51) Int. Cl.
G06F 3/00 (2006.01)
G03G 15/00 (2006.01)
B41B 15/00 (2006.01)

(52) U.S. Cl. ..................... 715/777; 399/81; 358/1.15

(58) Field of Classification Search ................. 345/735, 345/854, 780, 173, 777, 810; 700/83; 702/139; 270/58.09; 399/182, 81, 82, 84, 85, 86; 358/1.1, 358/1.2, 1.9, 1.15; 715/777, 810
See application file for complete search history.

(56) References Cited

U.S. PATENT DOCUMENTS

| | | | | |
|---|---|---|---|---|
| 4,843,538 A | * | 6/1989 | Lane et al. ..................... 700/83 |
| 5,182,796 A | * | 1/1993 | Shibayama et al. ........... 345/841 |
| 5,390,005 A | * | 2/1995 | Kimoto et al. ................. 399/81 |
| 5,459,552 A | * | 10/1995 | Ohira ............................. 399/1 |
| 5,497,455 A | * | 3/1996 | Suga et al. ................... 345/835 |
| 5,762,329 A | * | 6/1998 | Nakazato et al. ......... 270/58.09 |
| 5,937,232 A | * | 8/1999 | Taguchi et al. ............... 399/81 |
| 6,075,519 A | * | 6/2000 | Okatani et al. ............... 345/173 |
| 6,295,136 B1 | * | 9/2001 | Ono et al. ................... 358/1.15 |
| 6,325,585 B1 | * | 12/2001 | Sasaki et al. ................. 412/11 |
| 6,418,394 B1 | * | 7/2002 | Puolakanaho et al. ....... 702/139 |
| 6,433,801 B1 | * | 8/2002 | Moon et al. ................. 345/840 |
| 6,515,684 B1 | * | 2/2003 | Knodt ......................... 345/777 |
| 6,628,311 B1 | * | 9/2003 | Fang ........................... 345/777 |

FOREIGN PATENT DOCUMENTS

JP 06-227087 8/1994
JP 11-194667 7/1999

OTHER PUBLICATIONS

Epson Printer Device, Version 1.12dl, Copyright© Seiko Epson Corporation, 1999 (1 page, 4 Figures).

* cited by examiner

*Primary Examiner*—Kieu D. Vu
*Assistant Examiner*—Ting Zhou

(57) ABSTRACT

In an image processing apparatus which has a plurality of overlapping entry screens, a desired one is selectively displayed and various operation conditions are set on the selected entry screen. The contents of all the set operation conditions are displayed in the form of a list. The list is displayed together with an entry screen.

27 Claims, 13 Drawing Sheets

| post-set mode \ pre-set mode | | | | Setup | | | | | | | | |
|---|---|---|---|---|---|---|---|---|---|---|---|---|
| | | | | Copies | Paper Size | | | | ( )rion. | | Paper | |
| | | | | | [Letter] | Ledger | A4 | A3 | [Portrait] | Landscape | [Auto] | Upper Tray | 2nd Tray |
| Finishing | Collate | Collate | [Collate] | O | O | O | O | O | O | O | O | O | O |
| | | | UnCollated | × | O | O | O | O | O | O | O | O | O |
| | | Group | [Off] | × | O | O | O | O | O | O | O | O | O |
| | | | On | × | O | O | O | O | O | O | O | O | O |
| | Staple | | [None] | O | O | O | O | O | O | O | O | O | O |
| | | | Corner | O | O | O | O | O | O | O | O | O | O |
| | | | Long Edge 2-points | O | O | O | O | O | O | O | O | O | O |
| | | | Short Edge 2-points | O | × | O | × | O | O | O | O | O | O |
| | | | Center 2-points | O | O | O | O | O | O | O | O | O | O |
| | Hole-Punch | | [None] | O | O | O | O | O | O | O | O | O | O |
| | | | Long Edge Punch | O | O | O | O | O | O | O | O | O | O |
| | | | Short Edge Punch | O | × | O | × | O | O | O | O | O | O |
| | Folding | | [None] | O | O | O | O | O | O | O | O | O | O |
| | | | Crease | O | × | O | × | O | O | O | O | O | O |
| | | | Half-Fold | O | × | O | × | O | O | O | O | O | O |
| | | | Z-Fold | O | O | O | O | O | O | O | O | × | × |

IMAGE PROCESSING APPARATUS, AND METHOD OF CONTROLLING THE IMAGE PROCESSING APPARATUS

RELATED APPLICATION

This application is based on application No. 2000-28275 filed in Japan, the entire content of which is hereby incorporated by reference.

BACKGROUND OF THE INVENTION

1. Field of the Invention

The present invention relates to a technology of setting a plurality of items associated with operation conditions of an image processing apparatus such as a printer or a copier.

2. Description of the Related Art

Some of the recent copiers and printers have not only printing functions but also postprocessing functions performed after printing. The postprocessing functions include stapling, punching and paper folding. Printing is performed based on operation conditions such as "the number of copies", "the paper size", "the orientation of printing", "whether to perform duplex printing or not" and "selection of a paper feed tray." Postprocessing is performed based on operation conditions such as "whether to perform stapling or not", "the position stapled", "whether to perform punching or not", "the position punched", "N-up" and "covered binding."

The user sets operation conditions of a printer or a copier through a printer driver. The printer driver displays on the display an entry screen for entering data for a plurality of items specifying operation conditions. The printer driver registers the data entered by the user as the set values of the corresponding items, and sets the operation conditions.

In recent years, the number of operation conditions has been increasing because the number of printing functions and postprocessing functions has been increasing. Since this increases the number of items for which data is to be entered, it is difficult to display all the items within one entry screen.

For this reason, recent printer drivers accept data entry by displaying a plurality of entry screens so as to be switchable on the display. The items are all classified into a plurality of groups, and an entry screen is provided for each group. The entry screens each have the form of a card and are displayed so as to overlap one another on the display. A desired entry screen is displayed on the top by selecting the tab provided for the entry screen. The tab is labeled with "Setup", "Finishing" or the like. From the label, the user can grasp the items that can be set on the entry screen up to a point.

Some of the printing functions and the postprocessing functions cannot be selected unless an appropriate value is set for a certain item. For example, in a copier where it is mechanically impossible to perform stapling or punching on the short edge when the paper size is A4, it is necessary that a value making the paper size, for example, A3 be set for the item specifying the paper size.

Moreover, when an operation condition is specified by items existing over a plurality of entry screens, in other words, when it is necessary to enter appropriate data while switching entry screens, the following problem arises: When data is entered for an item on the displayed entry screen, it is necessary for the user to be conscious of the data having been entered or to be entered on other entry screens being hidden. Consequently, data entry requires time and effort, so that operation condition setting cannot be performed quickly and easily.

SUMMARY OF THE INVENTION

An object of the present invention is to provide solutions to the above-mentioned problems.

Another object of the present invention is to provide an image processing apparatus where operation conditions can be easily entered.

Yet another object of the present invention is to provide an image processing apparatus where an appropriate value can be easily set even when an operation condition is specified by items existing over a plurality of entry screens.

Still another object of the present invention is to provide an image processing apparatus where a plurality of operation conditions existing on different entry screens can be easily referred to.

These and other objects are attained by an image processing apparatus having, a plurality of entry screens, first display means for selectively displaying a plurality of entry screens, setting means for setting an operation condition on a displayed entry screen, a list screen on which all the set operation conditions are collectively displayed, and second display means for displaying the entry screen displayed by the first display means and the list screen at the same time.

Moreover, the above-mentioned objects of the present invention are achieved by a setting method having, a first step in which one of a plurality of entry screens is displayed, a second step in which an operation condition is set on the displayed entry screen, a third step in which a plurality of operation conditions is set by repeating the first step and the second step, and a fourth step in which a list of all the set operation conditions and the entry screen are displayed at the same time.

The invention itself, together with further objects and attendant advantages, will best be understood by reference to the following detailed description taken in conjunction with the accompanying drawings.

BRIEF DESCRIPTION OF THE DRAWINGS

FIG. 10 is a view showing part of a determination table;

In the following description, like parts are designated by like reference numbers throughout the several drawings.

DESCRIPTION OF THE PREFERRED EMBODIMENT

Hereinafter, an embodiment of the present invention will be described with reference to the drawings.

Figure 1:
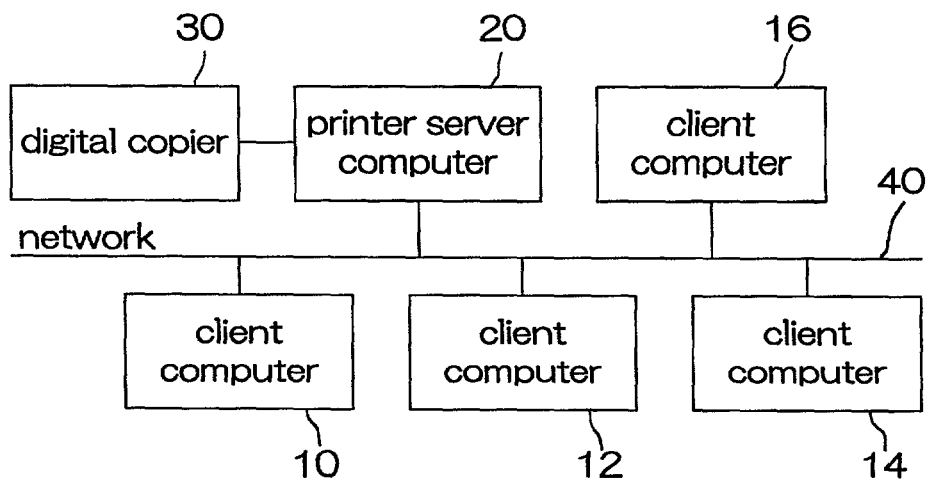
FIG. 1 is a schematic view showing the structure of a print system.

As shown in FIG. 1, the print system has a plurality of client computers 10, 12, 14 and 16, a printer server computer 20 and a digital copier 30. The client computers 10, 12, 14 and 16 and the printer server computer 20 are connected to a network 40.

Data and various commands can be communicated among the client computers 10, 12, 14 and 16 and between each of the client computers 10, 12, 14 and 16 and the printer server computer 20.

Figure 2:
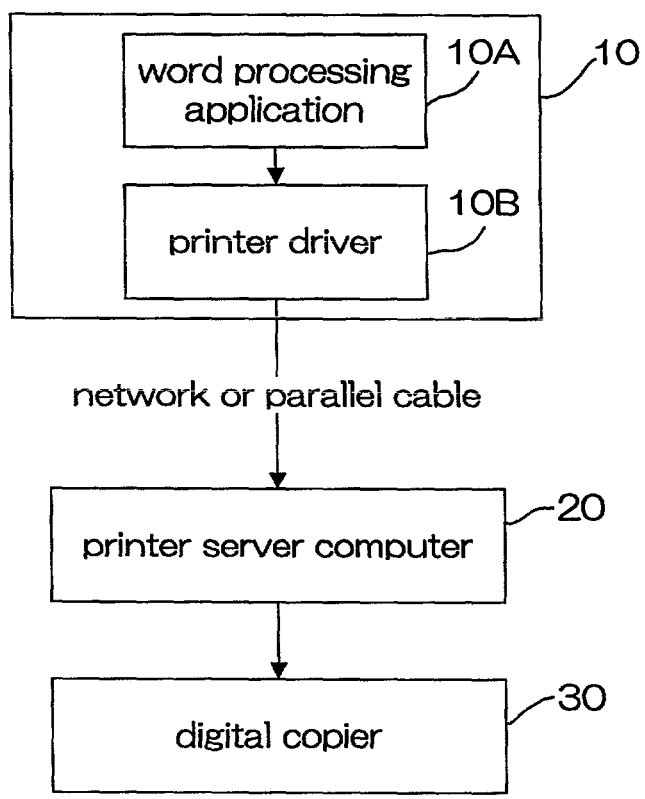
FIG. 2 is a view showing a connection among a client computer, a printer server computer and a digital copier.

As shown in FIG. 2, the client computers 10, 12, 14 and 16 are provided with a word processing application 10A and a printer driver 10B. The digital copier 30 is connected to the printer server computer 20, and is capable of not only copying but also printing of data received from the client computers 10, 12, 14 and 16 by way of the printer server computer 20.

Figure 3:
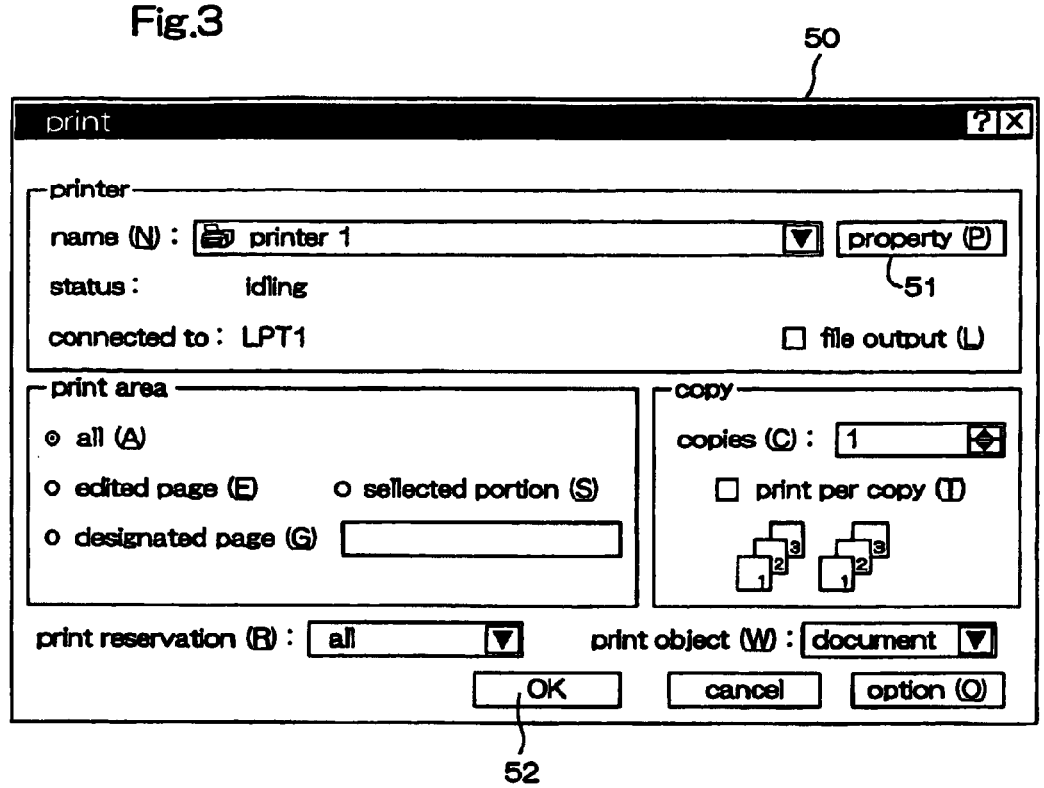
FIG. 3 is a view showing a print dialog box of a word processing application.
Figure 4:
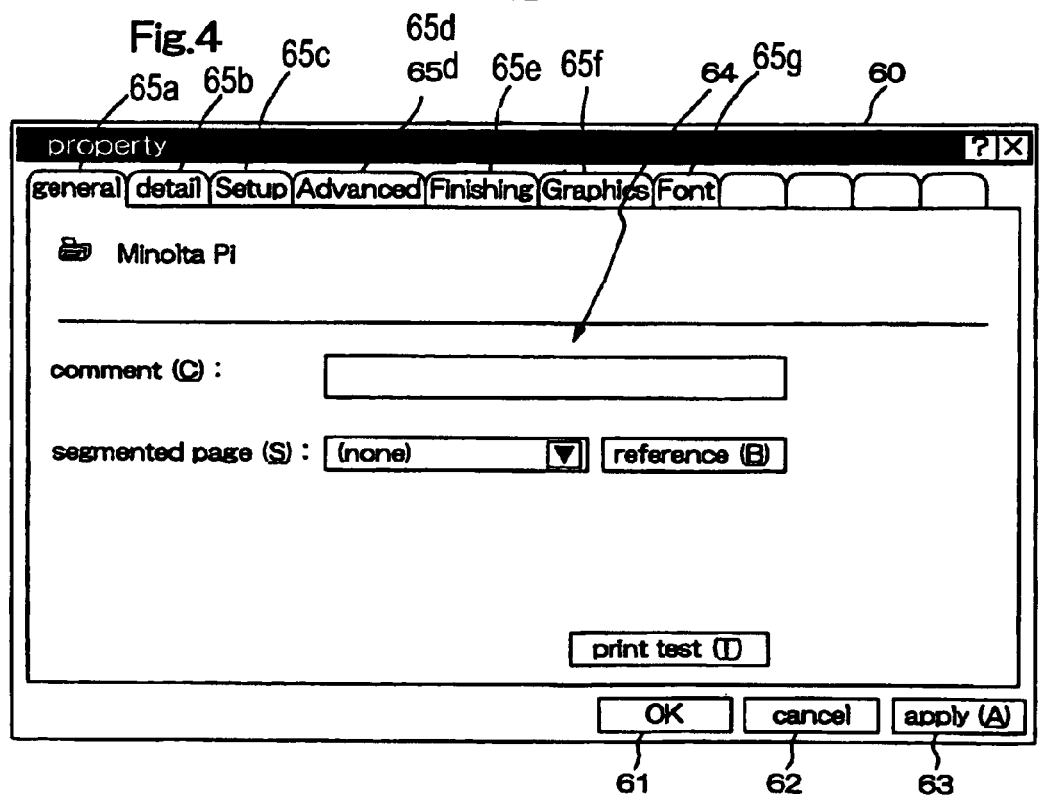
FIG. 4 is a view showing a properties window of a printer driver.

As shown in FIG. 3, the word processing application 10A displays a screen for print setting (print dialog box 50) on a display connected to the computer. As shown in FIG. 4, the printer driver 10B displays a screen for setting edit functions of the digital copier 30 (properties window 60) on the display. The edit function is a generic name for the print functions and the postprocessing functions performed after printing.

When the user clicks on a properties button 51 in the print dialog box 50, the properties window 60 opens. When the user clicks on an OK button 61 in the properties window 60, the properties window 60 closes after the set values are updated. When the user clicks on a cancel button 62, the properties window 60 closes without the set values updated. When an apply button 63 is clicked on, although the set values are updated, the properties window 60 remains open.

On the print dialog box 50, of the operation conditions associated with the print functions, basic ones such as "printer selection", "the print area" and "the number of copies" can be set. When the user clicks on an OK button 52 in the print dialog box 50, printing and postprocessing are started.

On the properties window 60, values can be set for a plurality of items specifying operation conditions associated with printing and a plurality of items specifying operation conditions associated with postprocessing. Since the number of items is large, a plurality of (in the illustrated example, eleven) entry screens 64, 66, 67, 68 are displayed so as to be switchable in the properties window 60. The items are all classified into a plurality of groups, and an entry screen is provided for each group. The entry screens 64, 66, 67, 68 each have the form of a card and are displayed so as to overlap one another. A tab 65 is provided at the upper end of each entry screen. The eleven tabs 65a–g do not overlap one another. The tabs 65a–g are labeled with "General", "Details", "Setup", "Advanced", "Finishing ", "Graphics", "Font" and the like. When the user clicks on a tab 65, the entry screen 64 provided with the tab 65 is displayed on the top.

Figure 5:
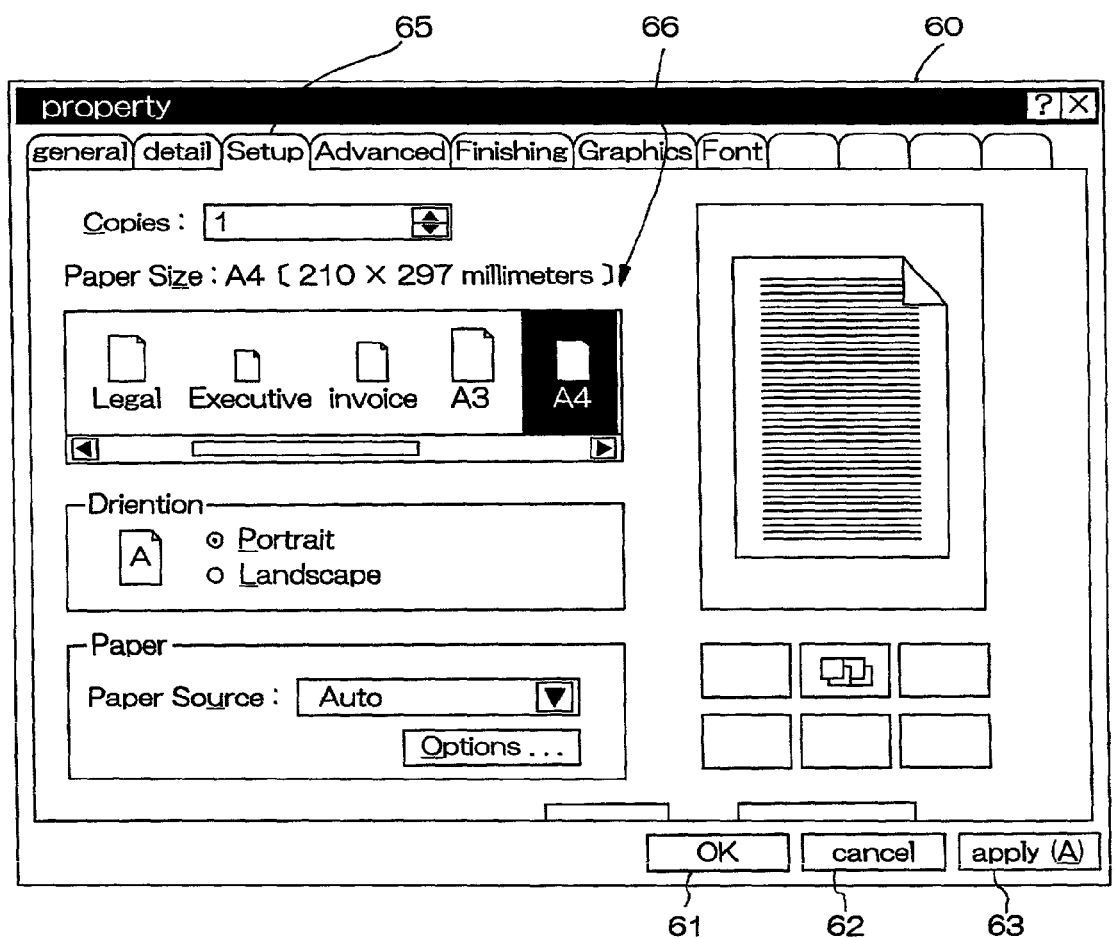
FIG. 5 is a view showing an entry screen of "Setup"
Figure 6:
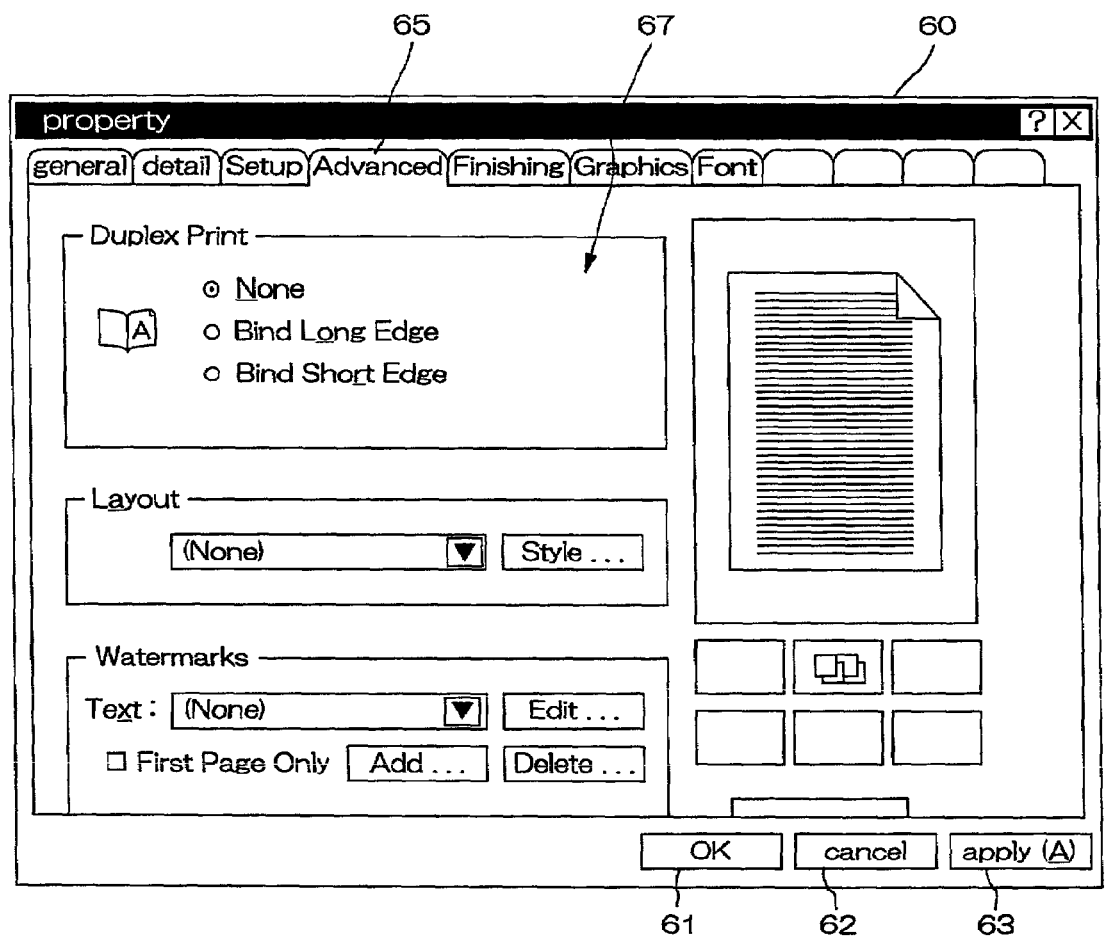
FIG. 6 is a view showing an entry screen of "Advanced"
Figure 7:
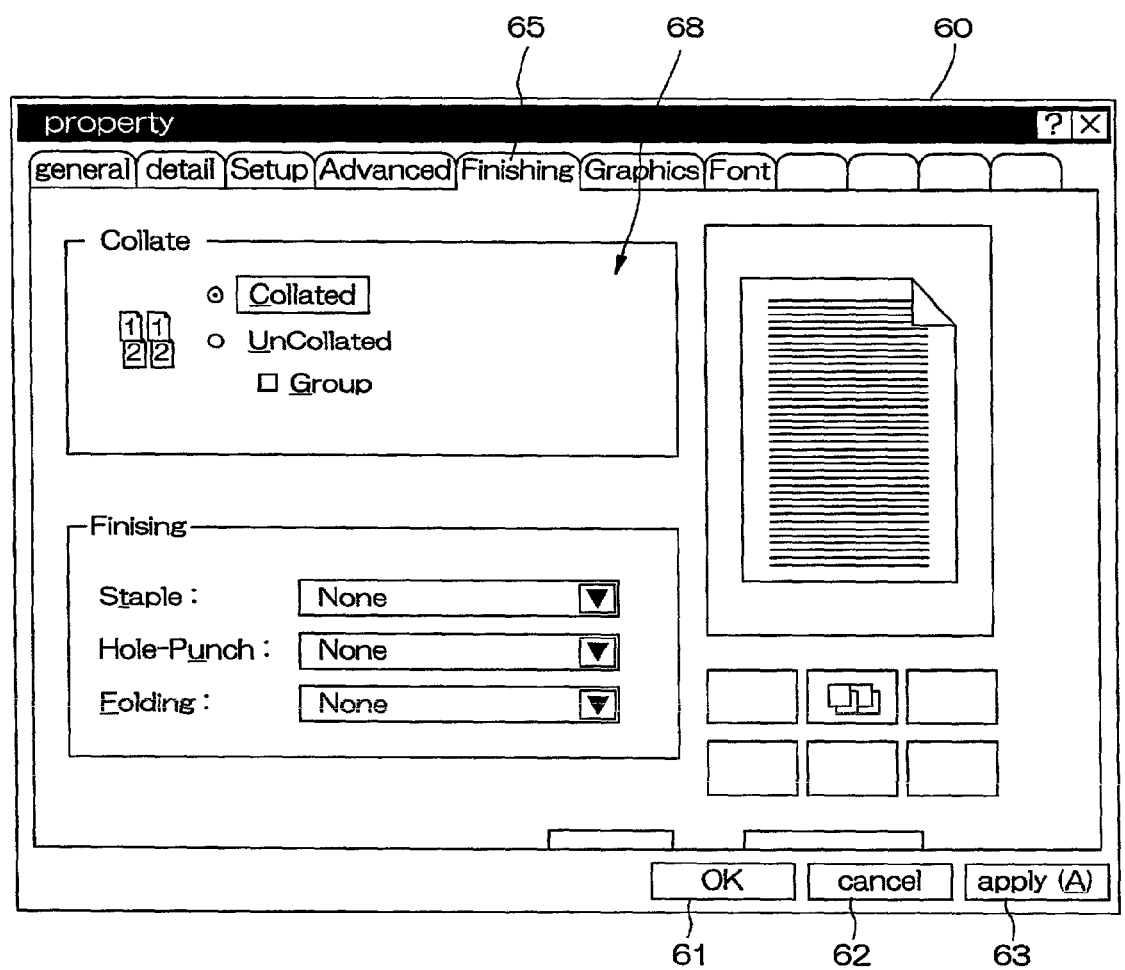
FIG. 7 is a view showing an entry screen of "Finishing"

FIG. 5 shows an example of an entry screen 66 of a group "Setup." FIG. 6 shows an example of an entry screen 67 of a group "Advanced." FIG. 7 shows an example of an entry screen 68 of a group "Finishing." In the following description, the entry screens 66 to 68 will also be referred to as "Setup tab 66", "Advanced tab 67", and "Finishing tab 68", respectively.

The items displayed on the entry screens 66 to 68 are as follows:

(1) Setup tab 66 (FIG. 5)
"Copies": item specifying the number of copies
"Paper Size": item specifying the paper size
"Orientation": item specifying the orientation of printing with respect to the sheet
"Paper Source": item specifying the paper feed tray (2) Advanced tab 67 (FIG. 6)
"Duplex Print": item specifying whether to perform duplex printing or not, and the position of the binding margin in duplex printing
"Layout": item specifying a layout such as N-up or magazine binding
"Watermarks": item specifying printing of watermarks (3) Finishing tab 68 (FIG. 7)
"Collate": item specifying the order of output when a plurality of copies is printed
"Staple": item specifying the position where the printed sheets are stapled
"Hole-Punch": item specifying the position where the printed sheets are punched
"Folding": item specifying folding of the printed sheets While the other entry screens are not shown, on the entry screen of a group "Graphics", items specifying whether to perform halftone processing or not, contrast adjustment and the like are shown. On the entry screen of a group "Font", items specifying whether to print the data as it is in a True Type font or not and the like are shown.

Figure 8:
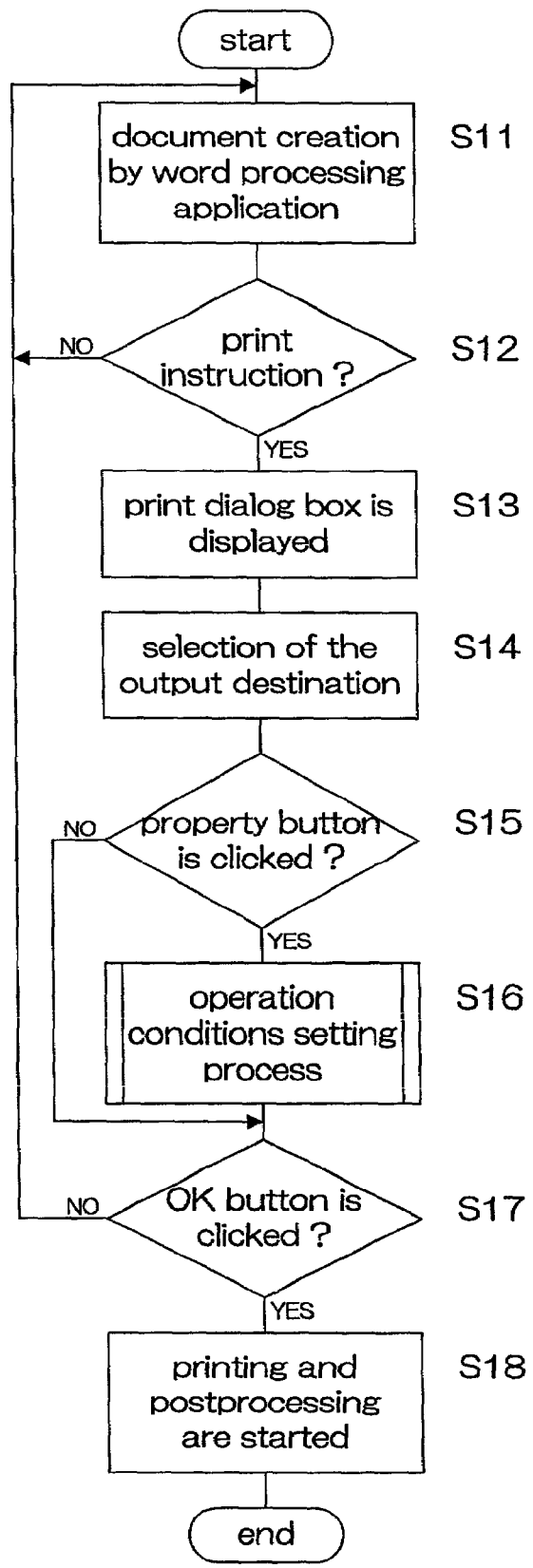
FIG. 8 is a flowchart showing processing performed by a client computer.

FIG. 8 is a flowchart showing the processing performed by the client computer 10.

The user creates a document by use of the word processing application 10A that runs on the client computer 10 (S11). When an instruction to print the document is provided ("Y" of S12), the word processing application 10A displays the print dialog box 50 on the display (S13).

On the print dialog box 50, the user selects the digital copier 30 or the printer to which the data is output (S14). When the user clicks on the properties button 51 ("Y" of S15), the printer driver 10B of the selected digital copier 30 is activated. The printer driver 10B sets values for a plurality of items specifying operation conditions associated with editing (S16).

In a case where the properties button 51 is not clicked on ("N" of S15) or after the operation condition setting by the printer driver 10B is finished, when the OK button 52 in the print dialog box 50 is clicked on ("Y" of S17), the digital copier 30 starts printing and postprocessing (S18). The digital copier 30 operates based on the operation conditions set by the printer driver 10B at step S16.

Figure 9:
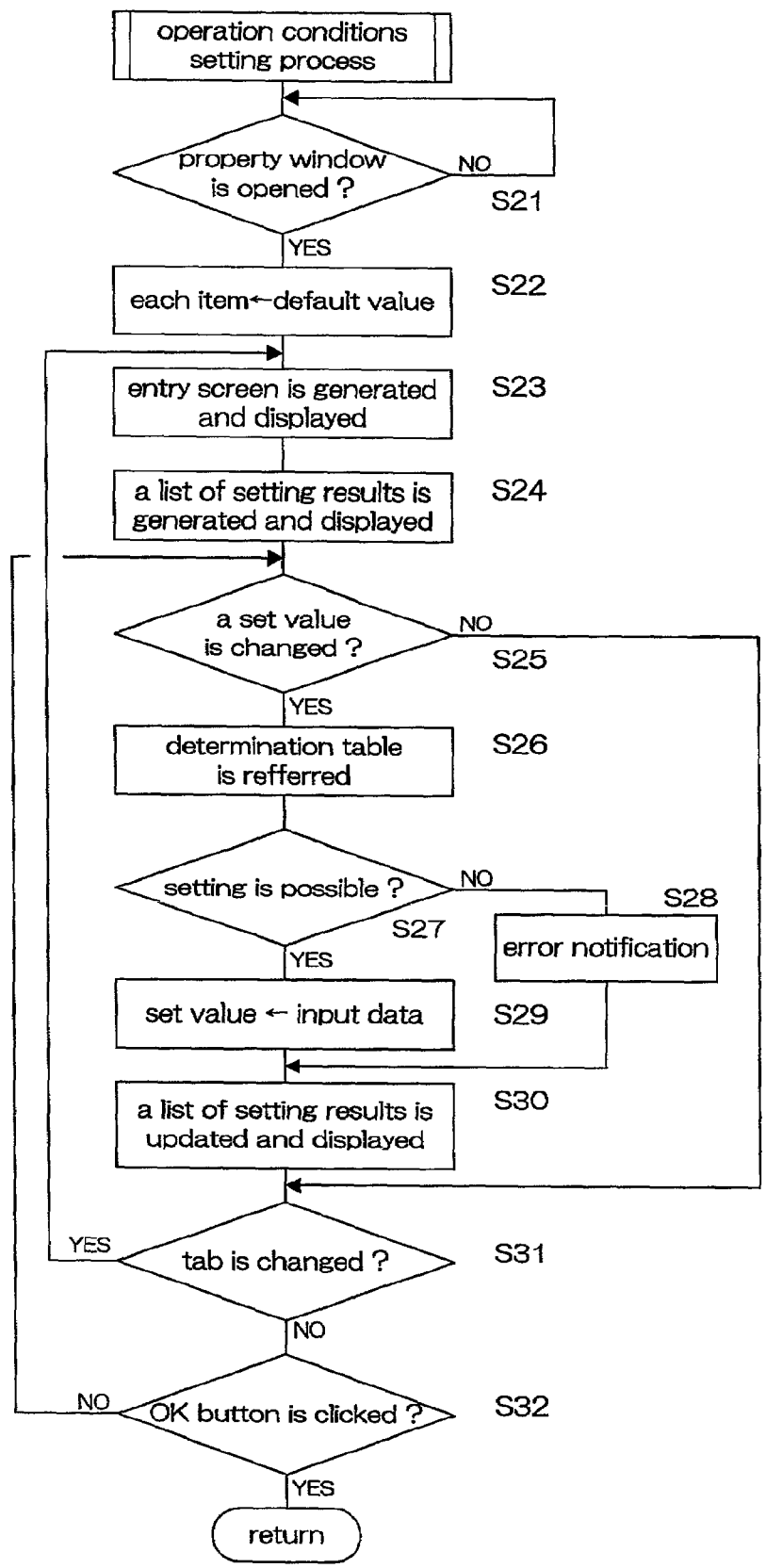
FIG. 9 is a flowchart showing operation condition setting processing shown in FIG. 8.

FIG. 9 is a flowchart showing the operation condition setting processing (S16) shown in FIG. 8.

The printer driver 10B displays the properties window 60 on the display ("Y" of S21). The printer driver 10B calls up pre-registered default values, and sets the default values for the corresponding items (S22).

The user clicks on a tab 65 labeled with a desired one of a plurality of groups. The printer driver 10B selects the group the tab 65 of which is clicked on, and generates an entry screen for entering data for the items belonging to the selected group (S23). The printer driver 10B displays the generated entry screen in the properties window 60 (S23).

Figure 11:
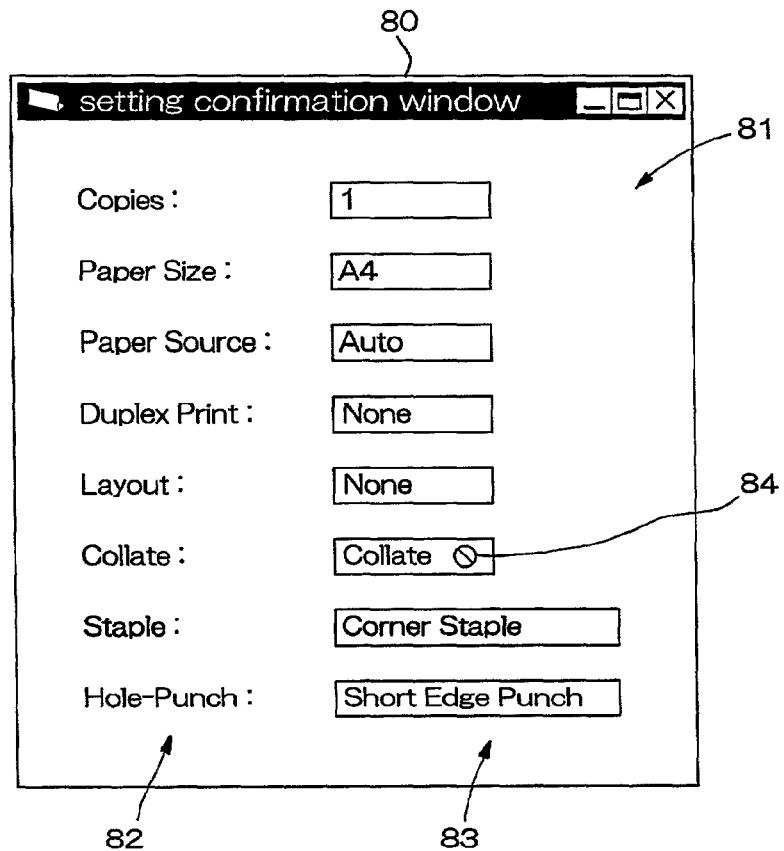
FIG. 11 is a view showing a list of setting results.

The printer driver 10B judges the operation condition setting results based on the set values of all the items, and generates a list of setting results (S24). The printer driver 10B displays a list 81 as shown in FIG. 11 on the display (S24). The setting result list 81 will be described later.

When the user enters data for an item on the displayed entry screen, the printer driver 10B determines that a set value has been changed ("Y" of S25). However, setting at which the digital copier 30 cannot operate must be avoided. More specifically, setting of items associated with edit functions not supported by the digital copier 30 must be inhibited. Setting contradictory to an already set value must also be inhibited.

Therefore, with reference to a determination table 70 as shown in FIG. 10, the printer driver 10B detects combinations of set values at which the digital copier 30 can operate (S26). The printer driver 10B determines whether the entered data can be set as a new set value or not (S27). This determination is made based on whether combination of the entered data and the set value of another item is inhibited or not.

When the setting is impossible ("N" of S27), the printer driver 10B provides the user with an error notification that the setting is inhibited, and prompts the user to enter appropriate data (S28). Moreover, the printer driver 10B is capable of forcibly setting a value at which the digital copier 30 can operate and notifying the user of this.

When the setting is possible ("Y" of S27), the printer driver 10B registers the entered data as the set value of the corresponding item (S29).

The printer driver 10B again judges the operation condition setting results based on the set values of all the items, and displays an updated setting result list 81 (S30).

When the user enters data for another item on the same entry screen ("N" of S31, "N" of S32), the printer driver 10B performs steps S25 to S30 and updates the list 81.

When the user clicks on another tab 65 ("Y" of S31), after displaying the selected entry screen on the top (S23), the printer driver 10B performs steps S24 to S30 and updates the list 81.

When the user clicks on the OK button 61 in the properties window 60 ("Y" of S32), the printer driver 10B updates the set values of the items and closes the properties window 60.

FIG. 10 shows part of the determination table 70.

In the determination table 70, combinations of set values at which the digital copier 30 can operate and combinations of set values at which the digital copier 30 cannot operate are recorded. The determination table 70 differs among the apparatuses to which data is output. The determination table 70 is provided in the form of a file as part of the printer driver 10B.

In the determination table 70, the "pre-set mode" represents items the set values of which have already been set, and the "post-set model" represents items the set values of which are to be changed. Inhibited combinations of the post-set mode and the preset mode are indicated by "X", whereas permitted combinations are indicated by "○."

The shown determination table 70 is referred to when the items of the group "Setup" are the preset mode and the items of the group "Finishing" is the post-set mode. In the digital copier 30 shown as an example, when the paper size is A4, it is mechanically impossible to perform stapling or punching on the short edge. Therefore, the cell representative of combination of "Short Edge 2-points" of the item "Staple" and "A4" of the item "Paper Size" is marked with "X". The cell representative of combination of "Short Edge Punch" of the item "Hole-Punch" and "A4" is also marked with "X". On the contrary, the cell representative of combination of "Long Edge 2-points" of the item "Staple" and "A4" is marked with "○". The combinations marked with "○" indicate that the digital copier 30 can operate without a hitch at these combinations of setting values.

When the user tries to set "Short Edge 2-points" or "Short Edge Punch" although the set paper size is A4, the printer driver 10B detects that the combination is inhibited with reference to the determination table 70. Consequently, the printer driver 10B inhibits such setting. When the user sets "Long Edge 2-points" in a case where the set paper size is A4, the printer driver 10B detects that the combination is permitted with reference to the determination table 70. Consequently, the printer driver 10B registers "Long Edge 2-points" for the item "Staple" as a new set value.

FIG. 11 is a view showing an example of the setting result list 81.

The list 81 is displayed in a setting confirmation window 80. The setting confirmation window 80 is opened separately from the properties window 60 on the display. The printer driver 10B always opens the setting confirmation window 80 when the properties window 60 is opened. However, the present invention is not limited to this configuration. For example, the printer driver 10B may open the setting confirmation window 80 to display the list 81 only when instructed to do so by the user.

The list 81 has a plurality of label fields 82 and data fields 83 disposed on the right of the label fields 82. In the label fields 82, the titles of the setting results are displayed. In the data fields 83, the set values and options are concretely displayed.

In the list 81, "Copies", "Paper Size", "Paper Source", "Duplex Print", "Layout", "Collate", "Staple" and "Hole-Punch" are displayed as the titles of the setting results. In FIG. 11, the set values and conditions are as follows: the number of copies, "1"; the paper size, "A4"; the paper feed tray, "Auto"; the duplex print, "None"; the layout, "None"; the position stapled, "Corner Staple"; and the position punched, "Short Edge Punch."

In the data field 83 of the title "Collate", the word "Collate" and an inhibition mark 84 are displayed. The inhibition mark 84 is added to the item the setting of which is inhibited. The setting of "Collate" is inhibited for the following reason: Since the currently set number of copies is one, it is meaningless to set "Uncollated" for the item "Collate" of the finishing tab 68. By adding the inhibition mark 84, the user can easily find the item the setting of which is inhibited. The means for notifying the user of inhibition of setting is not limited to the inhibition mark 84. For example, the title the setting of which is inhibited may be displayed in color, the word and the background in the data field 83 may be displayed in reverse video or the data field 83 may be grayed out.

To inhibit the setting by the user, the printer driver 10B grays out the items the setting of which is inhibited on the entry screen. In the above-described example, the printer driver 10B grays out the item "Collate" of the Finishing tab 68. The printer driver 10B is capable of displaying the reason for the inhibition as well as inhibiting setting. In the above-described example, a message "The set number of copies is one." or the like is displayed in a memo field provided in the properties window 60.

The shown list 81 shows the results of setting made on the Setup tab 66, the Advanced tab 67 and the Finishing tab 68 (FIGS. 5 to 7). However, the setting results of the item "Orientation" on the Setup tab 66, the item "Watermarks" on the Advanced tab 67 and the item "Folding" on the Finishing tab 68 are not shown. Further, the results of setting made on the other entry screens are not shown, either. These results are not shown for simplification of the description and not with the intention of limiting the present invention. Therefore, a list of all the setting results including the setting results not shown or described or a list of some of the setting results can be displayed.

Displaying a list of the operation condition setting results produces the following advantage: When data is entered for an item on the displayed entry screen, it is unnecessary for the user to be conscious of or memorize the data having been entered or to be entered on other entry screens being hidden. Therefore, even when an operation condition is specified by items existing over a plurality of entry screens, data entry is not complicated, so that an appropriate value can be quickly and easily set.

The setting result list is not limited to the above-described configuration, but may be modified as shown in FIGS. 12 to 17.

Figure 12:
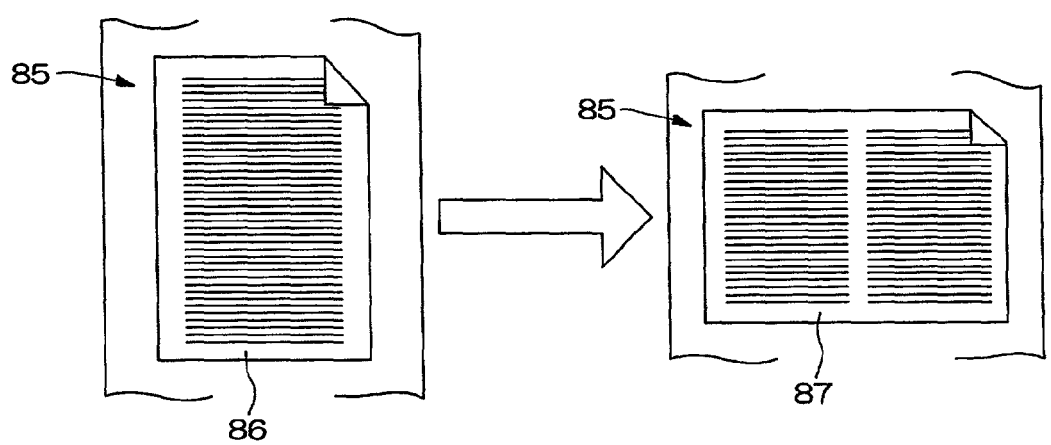
FIGS. 12 to 17 are views showing other examples of the list of setting results.

FIG. 12 is a view showing a relevant part of another example of the setting result list. The list 81 shown in FIG. 11 is generated by use of letters and numbers. On the contrary, a list 85 shown in FIG. 12 is created by use of symbols including letters, numbers and icons.

Description will be given using as an example "N-up" which is a setting result of the item "Layout" on the Advanced tab 67. The printer driver 10B generates the list 85 by use of an icon 86 representative of a condition "N-up: None", and displays the list 85 in the setting confirmation window 80. When the user set "2-up" for the item "Layout" under this condition, the printer driver 10B updates the list 85 to one using an icon 87 representative of a condition "2-up."

By generating the list 85 by use of the icons 86 and 87, the user can intuitively or visually grasp the setting results.

Figure 13:
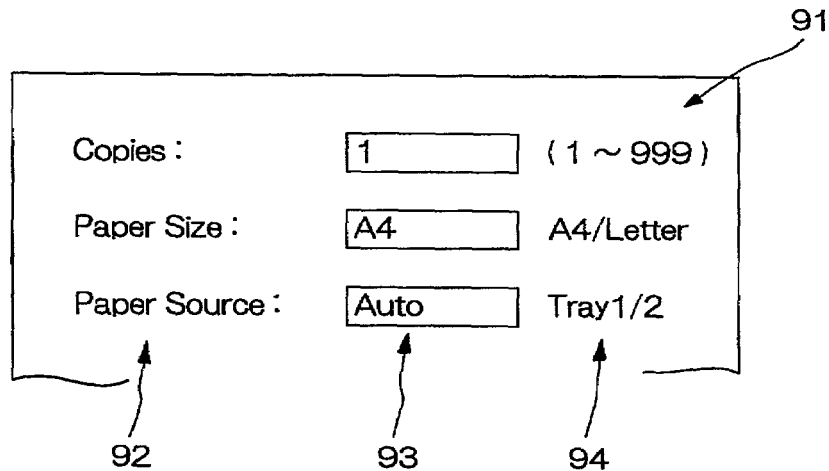

FIG. 13 is a view showing a relevant part of another example of the setting result list. The printer driver 10B generates a list 91 including settable values, and displays the list 91 in the setting confirmation window 80. The settable values include setting ranges and options of the items.

The list 91 has a plurality of label fields 92 and first and second data fields 93 and 94 disposed on the right of the label fields 92. In the first data fields 93, the set values and options are concretely displayed. In the second data fields 94, the settable values are displayed in accordance with the functions supported by the digital copier 30. For example, with respect to the number of copies, the set number "1" is displayed in the first data field 93, and the settable range "(1–999)" is displayed in the second data field 94. Likewise, with respect to the paper size, "A4/Letter" representative of the settable options is displayed in the second data field 94. With respect to the paper feed tray, "Tray 1/2" representative of the settable options is displayed in the second data field 94.

By generating the list 91 including the settable values, the user can easily find the settable ranges and options.

Figure 14:
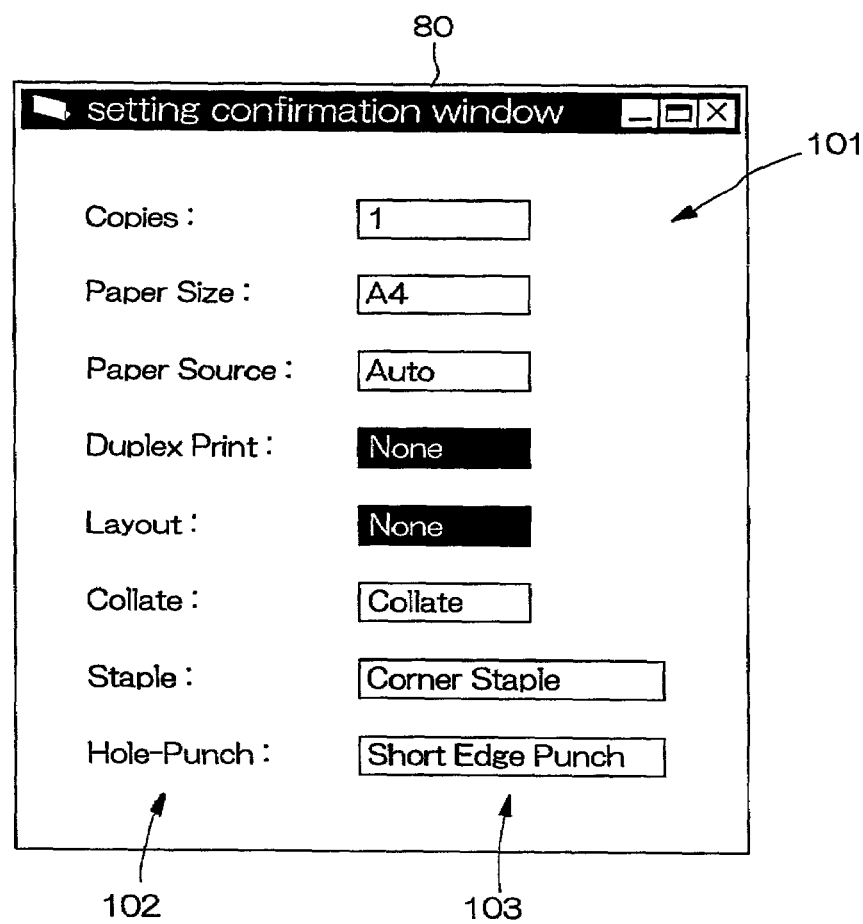

FIG. 14 is a view showing another example of the setting result list. In the list 101, the results of setting associated with the currently displayed entry screen are shown so as to be distinguished from the other setting results.

The list 101 has label fields 102 and data fields 103. Description will be given using as an example a case where the Advanced tab 67 is displayed on the top. First, the printer driver 10B identifies, among the setting results shown in the list 101, "Duplex Print" and "Layout" which are setting results decided based on the displayed Advanced tab 67. Then, the printer driver 10B generates the list 101 in which the identified "Duplex Print" and "Layout" are distinguished from the other setting results, and displays the list 101 in the setting confirmation window 80. The "Duplex Print" and "Layout" are distinguished from the other setting results by displaying the letters and the background in the data fields 103 in reverse video. The identified setting results may be distinguished from the other setting results by displaying the titles of the identified setting results in a different color from the other titles or by adding a mark.

Displaying the setting results associated with the currently displayed entry screen so as to be distinguished in the list 101 produces the following advantage: From the list 101, the user can easily find whether the entry screen including the item which the user intends to set is displayed or not. In the above-described example, the user finds that the Advanced tab 67 on which "Duplex Print" and "Layout" can be set is displayed.

Figure 15:
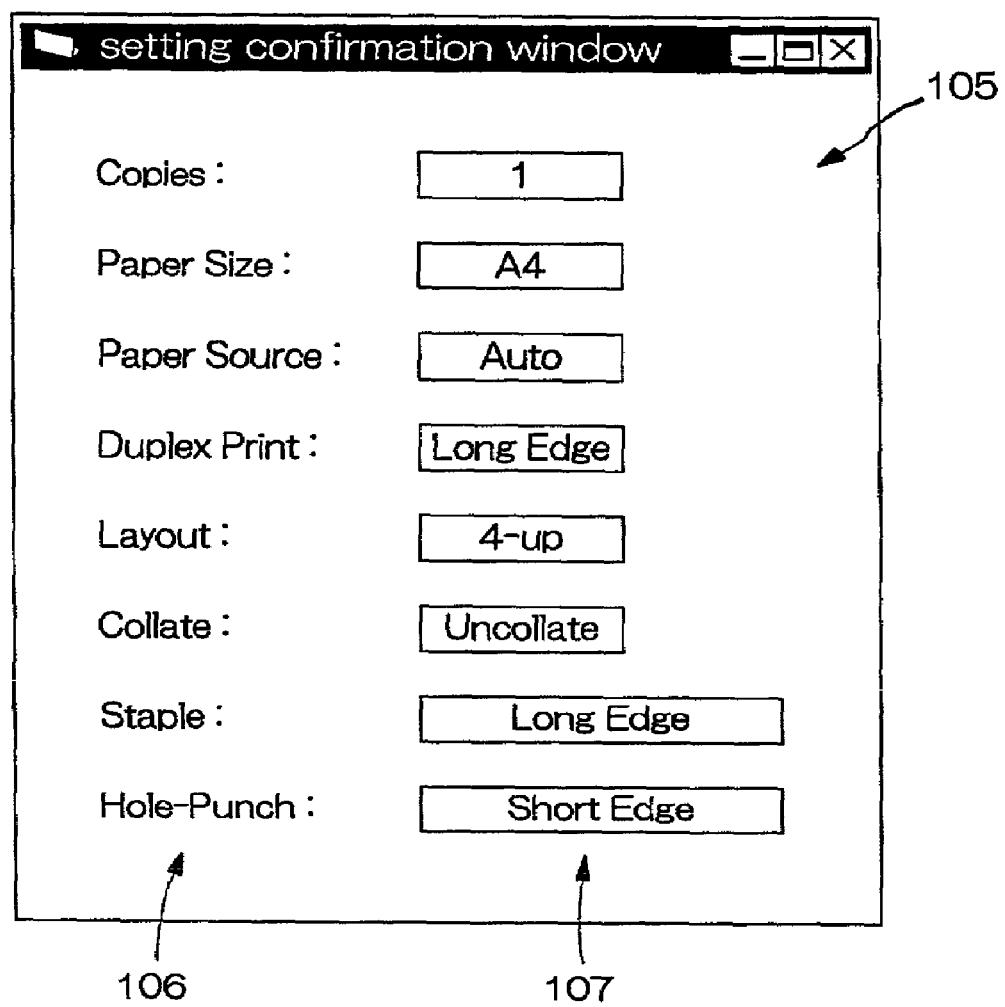

FIG. 15 is a view showing another example of the setting result list. On the list 105, the user can specify the entry screen which the user intends to display.

The list 105 has a plurality of label fields 106 and buttons 107 disposed on the right of the label fields 106. The buttons 107 are provided for selecting a setting result from among the setting results shown in the list 105. In the data field provided on each button 107, the set value or option is concretely displayed. For example, with respect to "Paper Size", the set paper size "A4" is displayed on the button 107.

Assume that the user clicks on the button 107 on which "A4" is displayed. This button 107 corresponds to, "Paper Size." Then, the printer driver 10B switches the entry screen to the Setup tab 66 including the item "Paper Size" deciding the selected setting result "Paper Size", and displays the Setup tab 66. The titles may be displayed on buttons.

Since the displayed entry screen can be switched on the list 105, the following advantage is produced: Even when a plurality of entry screens is displayed so as to overlap one another, the user can immediately display the target entry screen merely by clicking on the button 107 on which the item the user intends to set is displayed. Since the user is saved from having to repetitively click on the tab 65 until the target entry screen is displayed, operation condition setting can be performed more quickly and easily.

Figure 16:
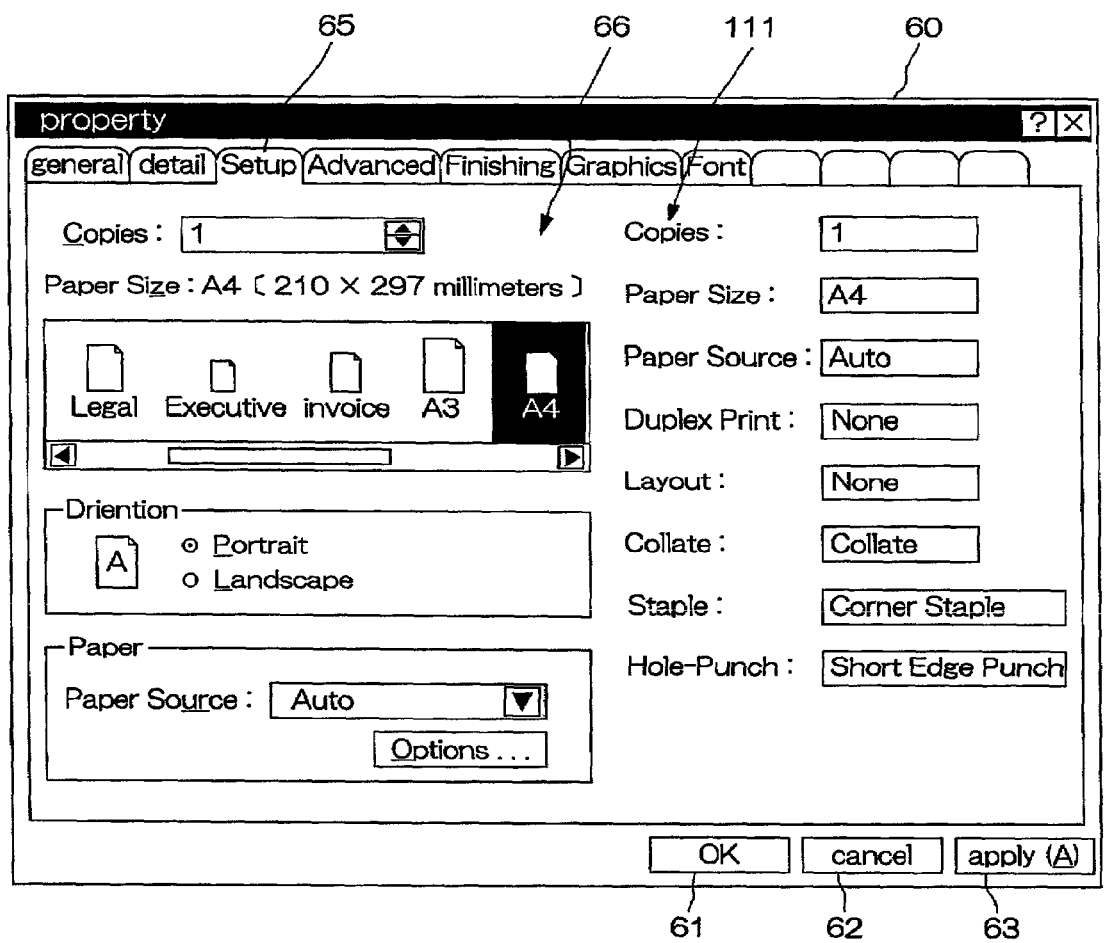
Figure 17:
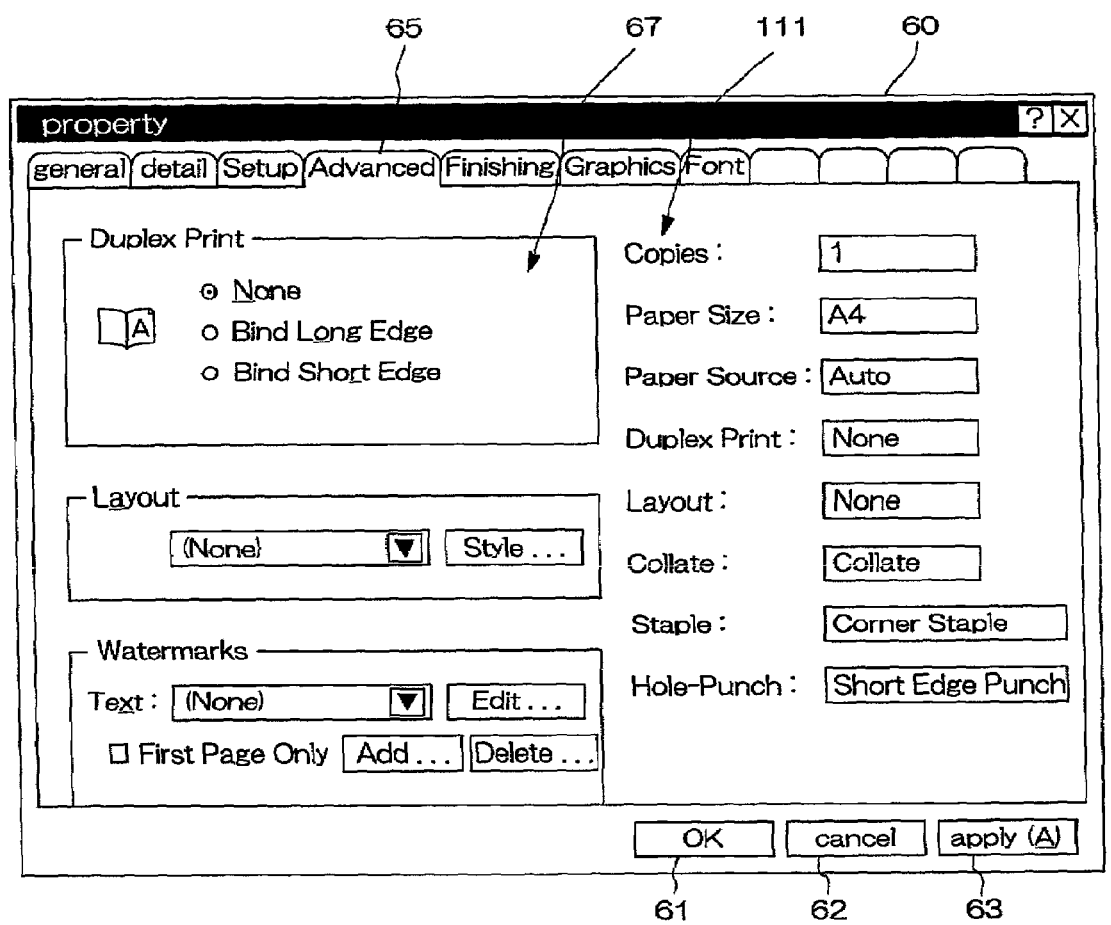

FIGS. 16 and 17 show other examples of the setting result list. FIG. 16 shows a condition where the Setup tab 66 is displayed in the properties window 60. FIG. 17 shows a condition where the Advanced tab 67 is displayed in the properties window 60.

The list 81 shown in FIG. 10 is displayed in the setting confirmation window 80 opened separately from the properties window 60. On the contrary, a list 111 shown in FIGS. 16 and 17 is displayed in the properties window 60. Although the entry screen is switched from the Setup tab 66 of FIG. 16 to the Advanced tab 67 of FIG. 17 by clicking on the tab 65, the list 111 is always displayed.

Storing a program describing the processing as shown in FIG. 9 in a computer-readable record medium allows a computer to function as an edit function setter or a printer driver.

As described above, according to the operation condition setting technology of this embodiment, since a list of operation condition setting results is displayed, even when an operation condition is specified by items existing over a plurality of entry screens, an appropriate value can be easily set.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A method of generating a user interface on a display for setting operation conditions through a plurality of entry screens, the method comprising:

displaying one of the plurality of entry screens;

receiving input on the displayed entry screen from a user to set operation conditions;

if the user selects another entry screen, displaying the selected entry screen instead of the current displayed entry screen; and displaying a window which shows a plurality of setting results set on the plurality of entry screens, said setting results set on the current displayed entry screen being shown to be distinguished from the other setting results.

2. A method as claimed in claim 1, wherein the window shows the setting results as diagrams, said diagrams having different shapes depending on the setting results.

3. A method as claimed in claim 2, wherein the diagrams are shown by use of icons.

4. A method as claimed in claim 1, wherein the window is displayed within an entry screen and continues to be displayed even if the entry screen is switched to another entry screen.

5. A method as claimed in claim 1, wherein the window is displayed in addition to the entry screens.

6. A method as claimed in claim 1, wherein the window shows some of the setting results.

7. A method as claimed in claim 1, wherein one of the entry screens is displayed when the user specifies one of the setting results on the window, said displayed entry screen being associated with the specified setting result.

8. A method as claimed in claim 1, wherein marks are displayed on the window to distinguish setting results associated with the current displayed entry screen from the other setting results.

9. A method as claimed in claim 1, wherein display attribution of the setting results associated with the current displayed entry screen is changed in contrast to the other setting results.

10. An image processing apparatus comprising:

a display;

a user interface and setting operation conditions on the display through a plurality of entry screens;

a receiving device for receiving input on a displayed entry screen from a user to set operation conditions, wherein:

if another of the plurality of entry screens is selected while the display displays one of the plurality of entry screens, the selected entry screen is displayed on the display instead of the current displayed entry screen, and the display displays a window showing a plurality of setting results set on the plurality of entry screens, said setting results set on the current displayed entry screen being shown to be distinguished from the other setting results.

11. The apparatus as claimed in claim 10, wherein the window shows the setting results as diagrams, said diagrams having different shapes depending on the setting results.

12. The apparatus as claimed in claim 11, wherein the diagrams are shown by use of icons.

13. The apparatus as claimed in claim 10, wherein the window is displayed within an entry screen and continues to be displayed even if the entry screen is switched to another entry screen.

14. The apparatus as claimed in claim 10, wherein the window is displayed in addition to the entry screens.

15. The apparatus as claimed in claim 10, wherein the window shows some of the setting results.

16. The apparatus as claimed in claim 10, wherein one of the entry screens is displayed when the user specifies one of the setting results on the window, said displayed entry screen being associated with the specified setting result.

17. The apparatus as claimed in claim 10, wherein marks are displayed on the window to distinguish setting results associated with the current displayed entry screen from the other setting results.

18. The apparatus as claimed in claim 10, wherein display attribution of the setting results associated with the current displayed entry screen is changed in contrast to the other setting results.

19. A computer-readable medium having computer executable instructions for performing steps comprising:

displaying one of a plurality of entry screens;

receiving input on the displayed entry screen from a user to set operation conditions;

if the user selects another entry screen, displaying the selected entry screen instead of the current displayed entry screen; and displaying a window which shows a plurality of setting results set on the plurality of entry screens, said setting results set on the current displayed entry screen being shown to be distinguished from the other setting results.

20. The computer-readable medium as claimed in claim 19, wherein the window shows the setting results as diagrams, said diagrams having different shapes depending on the setting results.

21. The computer-readable medium as claimed in claim 20, wherein the diagrams are shown by use of icons.

22. The computer-readable medium as claimed in claim 19, wherein the window is displayed within an entry screen and continues to be displayed even if the entry screen is switched to another entry screen.

23. The computer-readable medium as claimed in claim 19, wherein the window is displayed in addition to the entry screens.

24. The computer-readable medium as claimed in claim 19, wherein the window shows some of the setting results.

25. The computer-readable medium as claimed in claim 19, wherein one of the entry screens is displayed when the user specifies one of the setting results on the window, said displayed entry screen being associated with the specified setting result.

26. The computer-readable medium as claimed in claim 19, wherein marks are displayed on the window to distinguish setting results associated with the current displayed entry screen from the other setting results.

27. The computer-readable medium as claimed in claim 19, wherein display attribution of the setting results associated with the current displayed entry screen is changed in contrast to the other setting results.

* * * * *